(12) United States Patent
Johnstad et al.

(10) Patent No.: US 7,453,265 B2
(45) Date of Patent: Nov. 18, 2008

(54) DEVICE FOR MONITORING OF OIL-WATER INTERFACE

(75) Inventors: Svein Erling Johnstad, Bønes (NO); Fan-Nian Kong, Oslo (NO); Harald Westerdahl, Dal (NO)

(73) Assignee: Norsk Hydro ASA, Oslo (NO)

( * ) Notice: Subject to any disclaimer, the term of this patent is extended or adjusted under 35 U.S.C. 154(b) by 37 days.

(21) Appl. No.: 10/549,172

(22) PCT Filed: Mar. 19, 2004

(86) PCT No.: PCT/NO2004/000075

§ 371 (c)(1),
(2), (4) Date: Sep. 11, 2006

(87) PCT Pub. No.: WO2004/083790

PCT Pub. Date: Sep. 30, 2004

(65) Prior Publication Data

US 2007/0040557 A1 Feb. 22, 2007

(30) Foreign Application Priority Data

Mar. 21, 2003 (NO) .................................. 20031306

(51) Int. Cl.
*G01V 3/26* (2006.01)
*G01V 3/00* (2006.01)
(52) U.S. Cl. ....................................... 324/324; 324/337
(58) Field of Classification Search ................. 324/324, 324/333, 334, 337; 175/50; 342/22, 124; 73/290 R
See application file for complete search history.

(56) References Cited

U.S. PATENT DOCUMENTS

| 3,412,321 | A | * | 11/1968 | Unterberger et al. ........ 324/338 |
| 4,621,264 | A | | 11/1986 | Yashiro et al. |
| 4,833,321 | A | | 5/1989 | Lioret et al. |
| 5,609,059 | A | | 3/1997 | McEwan |

(Continued)

FOREIGN PATENT DOCUMENTS

EP 0 390 526 10/1990

(Continued)

*Primary Examiner*—Kenneth J Whittington
(74) *Attorney, Agent, or Firm*—Wenderoth, Lind & Ponack, L.L.P.

(57) ABSTRACT

A device for monitoring the position of an oil/water contact (OWC, 22) between an oil-continuous fluid (2*o*) overlying a water-continuous fluid (2*w*) inside a casing pipe (7). The device includes a transmitter (5) for a generating an electromagnetic signal (ST) and the transmitter (5) is provided with electrical energy ($G_T$) from a voltage signal generator (G). The transmitter (5) is arranged inside the casing pipe (7) in the oil-continuous fluid (2*o*) and above the oil-water contact (22). The electromagnetic wave signal ($S_T$) partly propagates downwards from the transmitter (5), is partly reflected from the oil-water contact (22), and is partly reflected by the end of the casing, giving rise to an upward propagating, reflected electro-magnetic signal ($S_R$). The device also includes a sensor (6) for detecting the reflected electromagnetic signal ($S_R$), and the sensor (6) is also arranged above the oil-water contact (22), providing a sensor signal ($R_R$) to a receiver (60) for receiving the sensor signal ($R_R$) and further to an analyzing device (61) for analyzing the sensor signal ($R_R$), e.g. with respect to two-way propagation time or amplitude in order to calculate an elevation level for the oil-water contact.

20 Claims, 8 Drawing Sheets

U.S. PATENT DOCUMENTS

| | | | |
|---|---|---|---|
| 5,811,677 A | | 9/1998 | Cournanc |
| 5,819,582 A | * | 10/1998 | Kelly ........................ 73/290 R |
| 6,114,857 A | * | 9/2000 | Kohl ........................... 324/534 |
| 6,480,000 B1 | * | 11/2002 | Kong et al. .................. 324/338 |
| 6,556,014 B1 | * | 4/2003 | Kong et al. .................. 324/338 |

FOREIGN PATENT DOCUMENTS

| | | |
|---|---|---|
| EP | 1 191 315 | 3/2002 |
| WO | 00/00849 | 1/2000 |
| WO | WO 00/00852 * | 1/2000 |

* cited by examiner

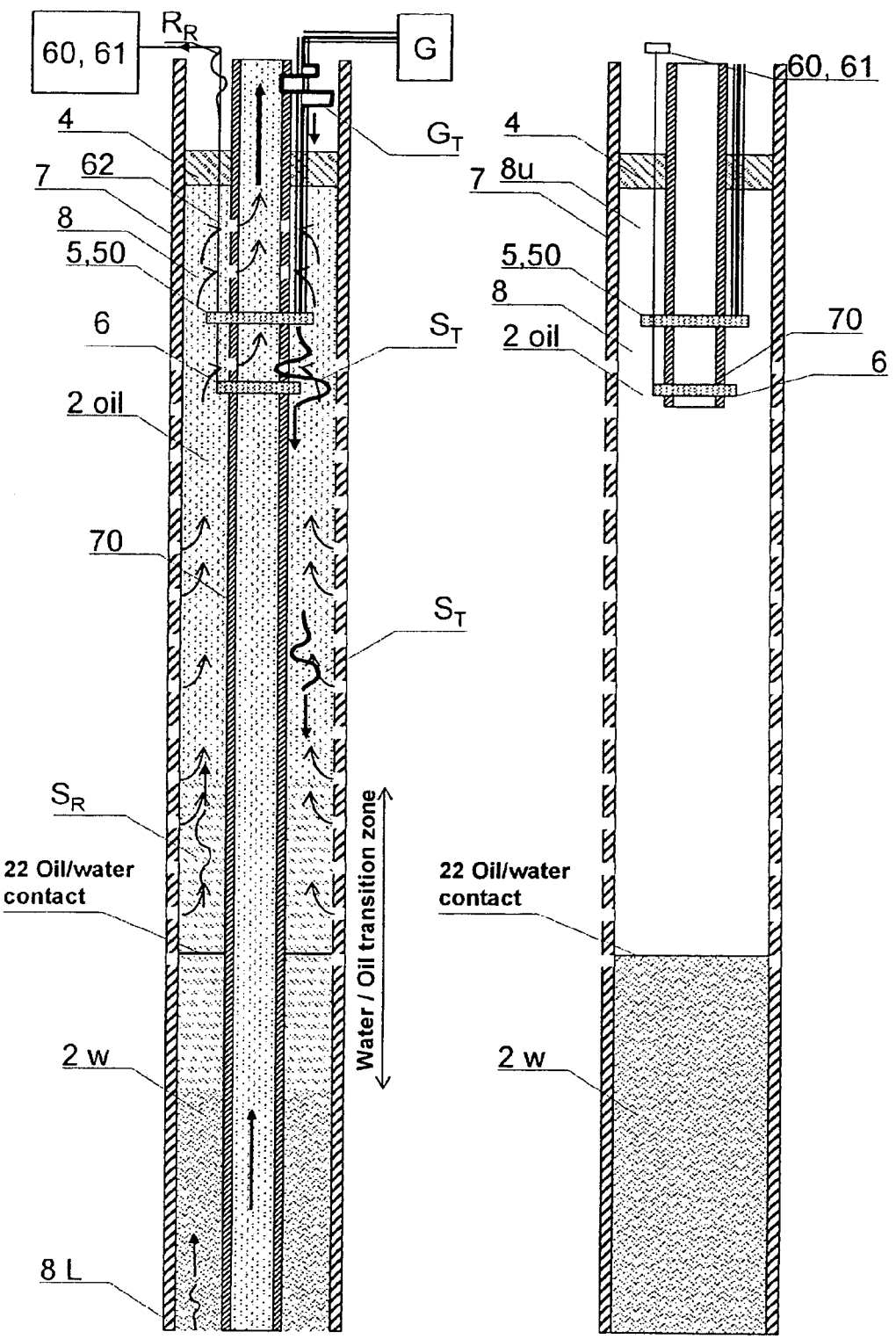

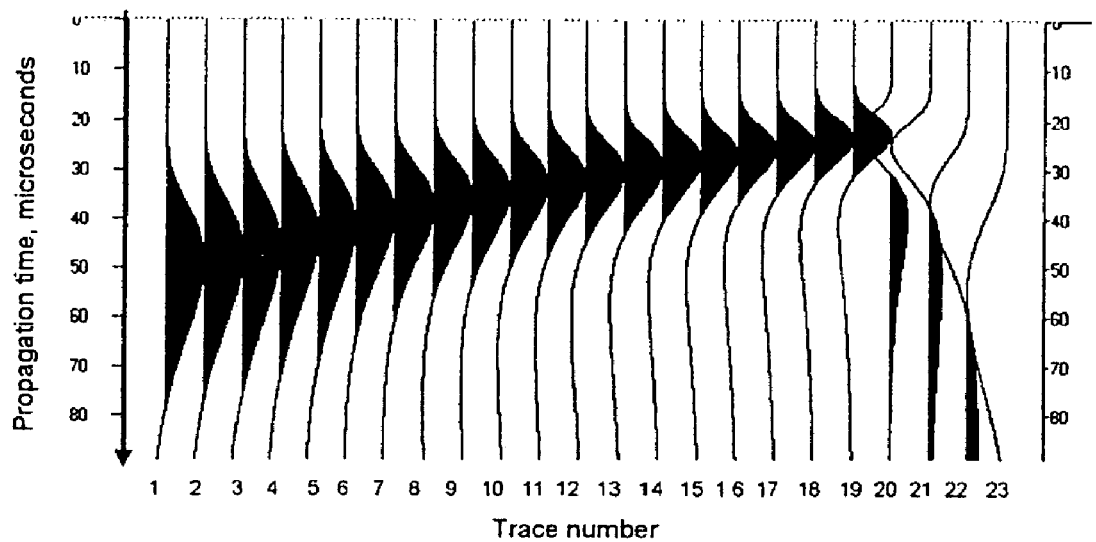
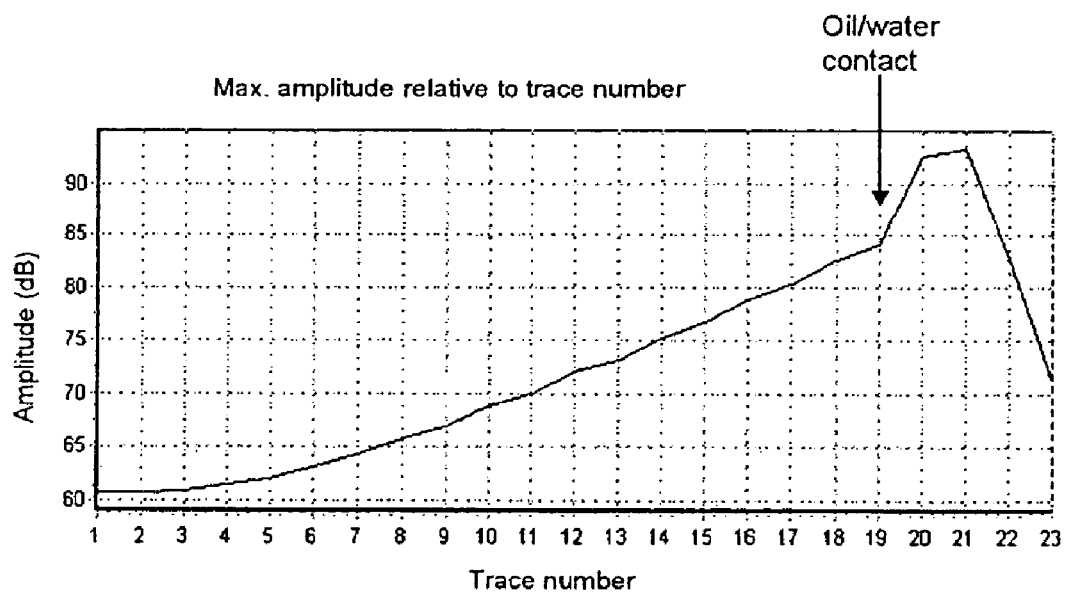
Fig. 9

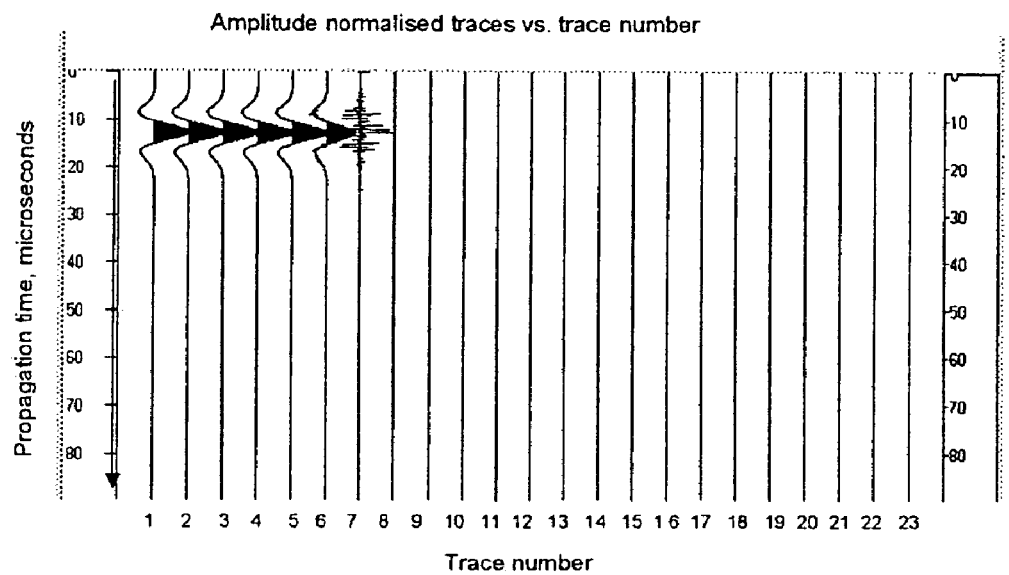
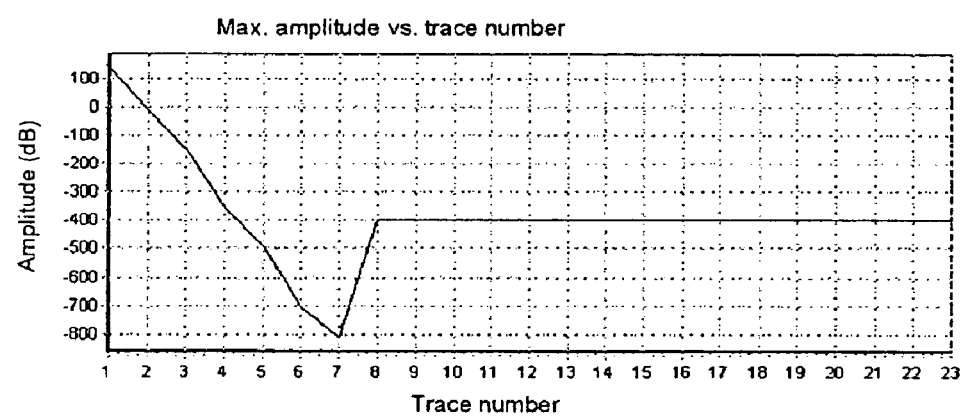
Fig. 11

DEVICE FOR MONITORING OF OIL-WATER INTERFACE

BACKGROUND OF THE INVENTION

1. Technical Field

The invention relates to a device for monitoring the position of an oil/water contact (OWC) between an oil-continuous fluid overlying a water-continuous fluid inside a casing pipe, using a transmitter for a generating an electro-magnetic signal, and detecting a reflected signal from the oil-water contact.

2. Description of the Related Art

A device for using guided electromagnetic waves along the outside of a conductive casing is presented in U.S. Pat. No. 6,480,000 to Fan-Nian Kong et al.

U.S. Pat. No. 5,926,024 to Blount, "System and method for measuring fluid properties by forming a coaxial transmission line in a cased well", is a logging instrument which transmits microwave frequency within a section of the wellbore. That apparatus is able to determine which zone is producing excessive amounts of water into the production fluids, but is incapable of measuring the distance down to an oil-water contact from a fixed position.

In order to produce a large proportion of oil from a well in which there is a risk of also producing water, there is an advantage in being able to monitor the depth to the oil-water contact (OWC) inside the production zone, inside the casing or screen through the production zone.

SUMMARY OF THE INVENTION

The present invention is a solution to this problem, and is represented by a device for monitoring the position of an oil/water contact (OWC) between an Al-continuous fluid overlying a water-continuous fluid inside a casing pipe. The device comprises the following features:

a transmitter for a generating an electromagnetic signal ST, said transmitter provided with electrical energy from a voltage signal generator;

said transmitter being arranged inside said oil-continuous fluid and being above said oil-water contact, and being inside said casing pipe, said electromagnetic wave signal for partly propagating downwards from said transmitter;

said electromagnetic wave signal for being partly reflected from said oil-water contact, and partly reflected by the end of the casing, giving rise to an upward propagating, reflected electromagnetic signal; and a sensor for detecting said reflected electromagnetic signal. The sensor is also arranged above said oil-water contact, providing a sensor signal to a receiver for receiving said sensor signal and further to an analyzing device for analyzing said sensor signal, e.g. with respect to two-way propagation time or amplitude in order for calculating an elevation level for said oil-water contact.

BRIEF DESCRIPTION OF THE DRAWINGS

The invention is illustrated in the attached drawings, which shall illustrate the invention only, and shall not be construed as a limitation of the invention, which shall be defined by the claims attached.

FIG. 1 illustrates one preferred embodiment of the invention, showing a casing pipe with an annulus room around a central production pipe, and a transmitter antenna arranged around said central pipe.

FIGS. 2 and 3 illustrate a similar casing pipe in which this internal "annulus" room (the interior of the casing below the packer above the production zone) lacks a production pipe except for in the upper portion below a packer. Similar to the embodiment of FIG. 1, a transmitter antenna is arranged around the existing short central pipe extending into the oil below the packer.

FIG. 9 is an illustration of the attenuated and reflected pulse of FIG. 8 at a water time, for the portion of the energy being reflected by the oil-water contact on its reflected path upwards from the oil-water contact.

FIG. 11 is an illustration of a modeled 100 kHz, tangential magnetic field propagation according to the physical model of FIG. 2. The upper portion of FIG. 11 shows amplitude-normalized traces of signal propagated to a given imagined receiver along the downward running signal's path. The lower portion of FIG. 11 shows a maximum amplitude-curve for a downward running signal. The oil-water contact OWC is not detected.

DETAILED DESCRIPTION OF THE INVENTION

Figure 3:
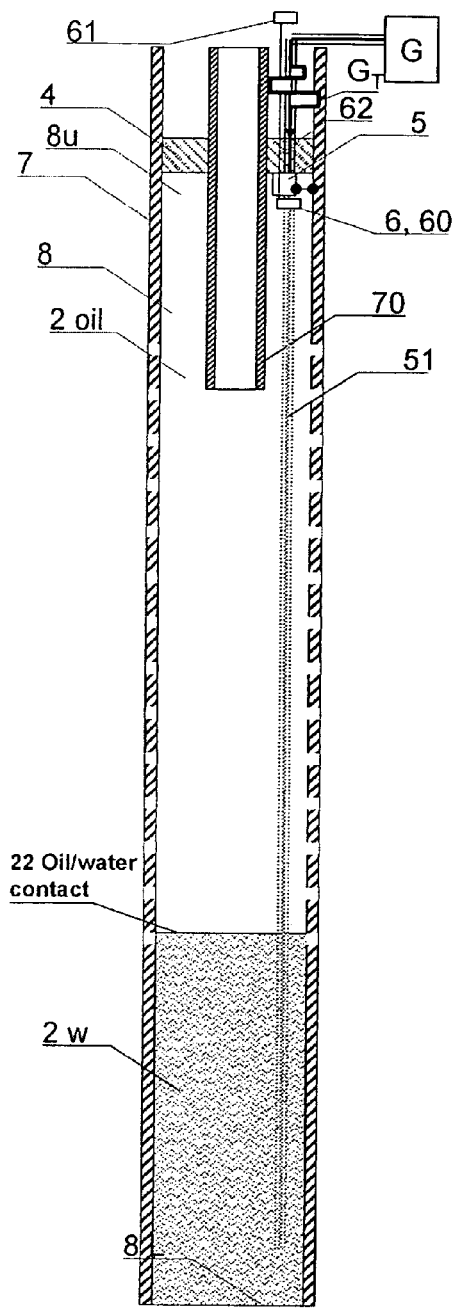

Below is given a description of preferred embodiments of the invention. FIG. 1 illustrates a vertical, longitudinal central section of a device for monitoring the position of an oil/water contact OWC, 22 between a petroleum fluid 20 overlying a water fluid 2w inside a casing pipe 7. Oil and gas petroleum fluids will tend to collect on top of water due to density differences and due to immiscibility between the petroleum fluids and the water. The water fluid $2w$ normally contains dissolved salts so that the water has low resistivity and thus attenuates electromagnetic waves more than petroleum fluids do. This difference in electromagnetic properties, i.e. resistivity, signal velocity and electrical impedance is utilized in the below described embodiments of the present invention. The petroleum fluid $2o$ is, as such, under normal circumstances a more or less petroleum-continuous fluid, in which gas may be dissolved by pressure, and in which water droplets may occur in an increasing number and size in a direction downwards towards the oil-water contact, but in which the oil forms a continuum. The water fluid $2w$ is, in this aspect, the opposite, in which a more or less water-continuous fluid $2w$ contains droplets of oil and/or gas, to a decreasing amount and size in a direction downwards from the oil-water contact. In a producing well in which water flows in from the petroleum-bearing formations to the annulus room 8 through perforation holes in the lower and intermediate zone of the casing wall 7, and oil leaves the upper portion $8u$ of said annulus room through perforations in the central production pipe 70, one will expect vigorous mixing in parts of the oil/water column, and the transition called the oil-water contact 22, OWC may be rather obscure as seen in small scale and difficult to define. This may be remedied using short and long wavelengths and one particular embodiment of the invention providing an extended signal path for the sensor signal, thus improving the resolution of the position of the oil-water contact 22, OWC.

All preferred embodiments of the invention comprise the following features:

A transmitter 5 for a generating an electromagnetic signal $S_T$, is arranged inside the casing pipe 7. The transmitter 5 is provided with electrical energy signals $G_T$ from a voltage signal generator G, see upper right part of FIG. 1. The transmitter 5 is preferably arranged inside the oil-continuous fluid $2o$ and also arranged above the oil-water contact 22, and, for this purpose, arranged inside said casing pipe 7, since the device shall monitor the OWC inside the casing pipe 7.

The electromagnetic wave signal $S_T$ will partly propagate downwards from the transmitter 5. The transmitter may have several different embodiments as will be described below. Further, while the signal will be attenuated while propagating downward through the oil and/or water, part of the electromagnetic wave signal $S_T$ will be partly reflected from the oil-water contact 22, and also partly reflected by the end of the casing, giving rise to an upward propagating, reflected electromagnetic signal $S_R$.

A sensor 6 is arranged for detecting said reflected electromagnetic signal $S_R$. The sensor 6 is also arranged above the oil-water contact 22, providing a sensor signal $R_R$ which it provides to a receiver 60 for receiving the sensor signal $R_R$. The receiver is further connected to an analyzing device 61 for analyzing the sensor signal $R_R$, e.g. with respect to two-way propagation time or amplitude in order for calculating an elevation level for the oil-water contact 22.

The Casing and Tubing in the Production Zone

The casing pipe 7 has an annulus room 8 around the central production pipe 70, as illustrated in FIGS. 1, 2, 3, 4, 5, and 6. In FIGS. 2 and 3 this internal annulus room lacks a production pipe 70 except for in the upper portion below a packer 4. The height (or length, in case of an deviated or inclined well) of this annulus room may be about 130 meters. The external diameter of the casing pipe 7 may be 8.5 inches (21.6 cm). The external diameter of the central production pipe may be 6 inches (15.2 cm).

FIGS. 1, 2, 3, 4, 5, and 6 illustrate preferred embodiments of the invention in which the transmitter 5 is arranged in an annulus room 8 between an outside of an inner, conductive tubing string 70 arranged inside the casing pipe 7, and the inner side of the casing pipe 7. The annulus space 8 between the conductive tubing string 70 and the casing pipe 7 conductive inner face constitutes a waveguide for at least part of the two-way path of said EM signals $S_T$, $S_R$.

In the preferred embodiment illustrated in FIGS. 1 and 2, the transmitter 5 comprises a toroidal transmitter antenna 50. The antenna 50 is arranged with the toroid arranged around the circumference of the conductive tubing string 70. The toroidal antenna 50 is provided for generating a transverse magnetic field $H_{TM}$ with respect to said conductive tubing string 70.

In the preferred embodiment illustrated in FIG. 1, the conductive tubing string 70 extends at least between said transmitter 5 and said oil-water contact OWC, 22. This embodiment has given positive results during the mathematical modeling and will be discussed below.

In the preferred embodiments of the invention, the electromagnetic transmitter 5 is arranged inside an upper portion $8u$ of said annulus room. However, there is a possibility that if the packer 4, which is arranged to seal the upper part of the annulus room $8u$, is not conductive, for instance made of rubber or similar material, the transmitter 5 may be arranged above the packer 4. In all the illustrated embodiments of the invention, the electromagnetic transmitter 5 is arranged below or above the mentioned packer 4 between the inside of the casing pipe 7 and the outside of the conductive tubing string 70. The packer 4 forms an upward barrier for fluids in the annulus room 8. In an advantageous embodiment of the invention, the above-mentioned toroidal antenna 50 is provided with a ring core 51 of mu-metal or ferrite, having high permeability.

In the preferred embodiments of the invention the emitted electromagnetic Signal $S_T$ has a frequency or frequencies in the range between 1 kHz and 10 MHz. More specific frequencies of 100 kHz and 1 MHz have been used in the modeling as described below. The modeled signal follows a Ricker pulse having a centre frequency of 100 kHz or 1 MHz, respectively. The power supplied by the generator G is in the range between 1 W and 10 kW.

In a preferred embodiment as illustrated in FIGS. 1 to 6, the sensor 6 provides said received electromagnetic signal $R_R$ to said receiver 60. An analyzing device 61 receives the signal from the receiver 60 via a signal conductor 62 arranged having a passage through the packer 4, when the sensor and/or the receiver is arranged below the packer 4, which is the normal case.

Figure 8:
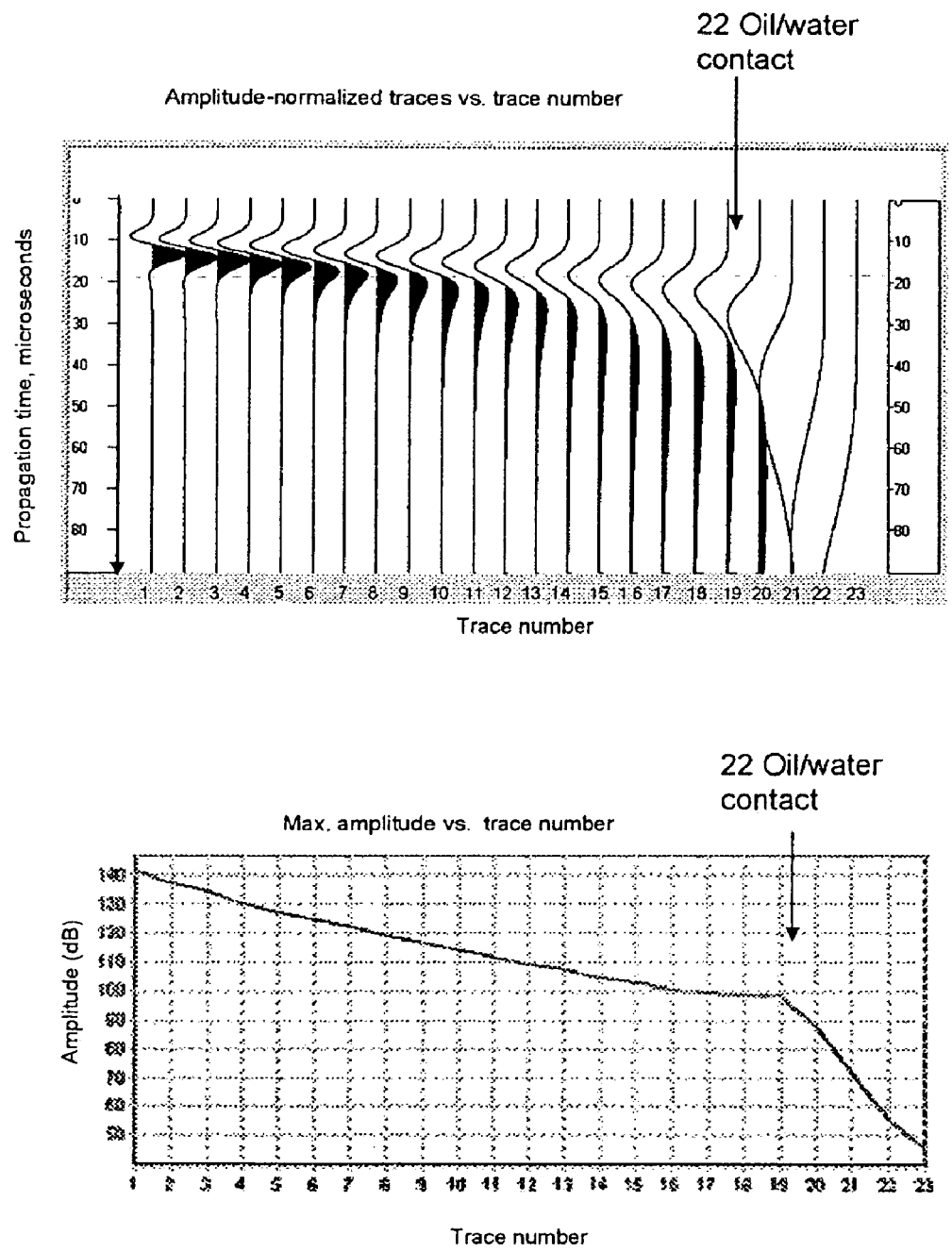
FIG. 8 is an illustration of a modeled 100 kHz, tangential magnetic field according to the physical model of FIG. 1. The upper portion of FIG. 8 shows amplitude-normalized traces of signal propagated to a given imagined receiver along the downward running signal's path. The lower portion of FIG. 8 shows a maximum amplitude curve for a downward running signal.

FIG. 8 is an illustration of a modeled 100 kHz, tangential magnetic field according to the physical model of FIG. 1. The pulse may be transmitted by means of a toroidal antenna as described above. The upper portion of FIG. 8 shows amplitude-normalized traces of signal propagated to each successive receiver of a row of imagined receivers along the downward running signal's path. The lower portion of FIG. 8 shows a maximum amplitude curve for downward running signal. The oil-water contact 22, OWC is between traces 19 and 20. One will see that the attenuation is 40 dB for the signal transmission down to 100 m where the oil-water contact occurs. Our modeling shows that for a 1 MHz signal the attenuation is 0.8 dB/m. In the water zone, we see that the attenuation is 2.5 dB/m for the 100 kHz signal and 8 dB/m for the 1 MHz signal.

FIG. 9 is an illustration of the attenuated, reflected pulse of FIG. 8 at a later time, for the portion of the energy being reflected by the oil-water contact 22, OWC on its reflected path upwards from the oil-water contact 22, OWC and back to the receiver sensor 6, preferably near the transmitter 5. One will see from FIG. 9 that the amplitude is reduced at approximately the same rate along the return path, about 40 dB. What started as a signal of 140 dB returns as a signal of slightly above 60 dB, having a well-defined top at about 50 μs.

Figure 10:
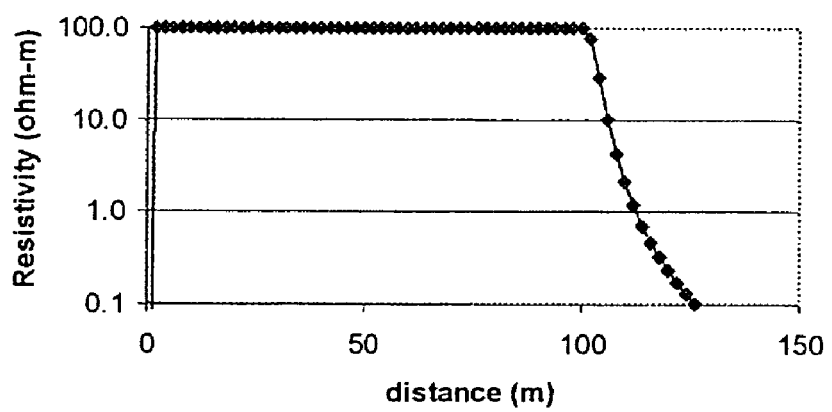
FIG. 10 is an image of a resistivity model used for calculating the direct wave only.

FIG. 10 is an image of a resistivity model used for calculating the direct wave only. The taper at the end of the model, from 100 m, is introduced to reduce reflections from the model boundary, to produce a "background" data set which may be subtracted to see the reflected energy in the other models with a sharp boundary between oil and water.

FIG. 11 illustrates a modeled 100 kHz, tangential magnetic field according to the physical model of FIG. 2, with similar transmitter and receiver arrangements, but with the significant difference that the inner pipe 70 only extends 5 meters below the toroidal transmitter 5, 50. The upper portion of FIG. 11 shows the rapidly vanishing signal beyond trace No. 6. The lower portion of FIG. 11 shows a maximum amplitude curve for a downward running signal. Obviously, the attenuation is too high for the signal, about 30 dB/m. After four to six traces only numerical noise is present in the modeling. The modeling may be uncertain due to singularities at the center of the casing. We expect that a TE-field would be better to use if there is no central pipe 70 present inside the casing 7, as we expect the TE-mode to be attenuated less in such an embodiment. An alternative is to arrange a conductive wire as described below and illustrated in FIGS. 3, 4, 5, and 6.

Figure 12:
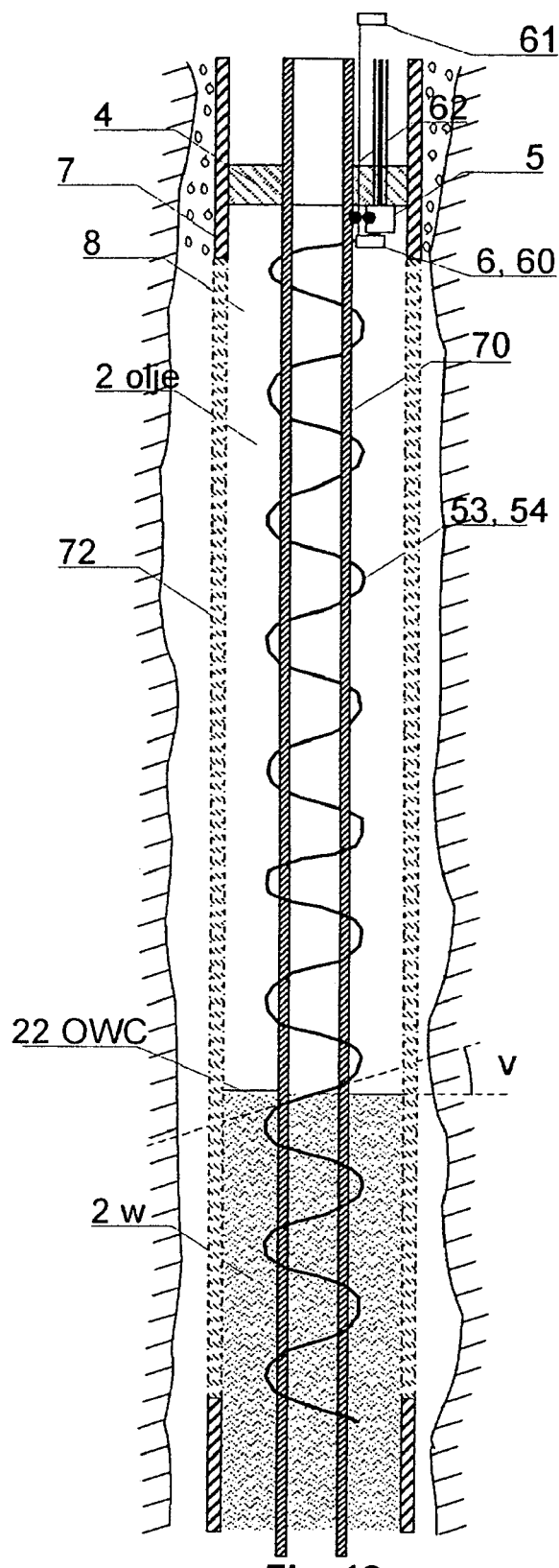
FIG. 12 is an illustration of an embodiment in which a metallic screen or mesh replaces the metallic casing in the production well through the petroleum producing formation.

FIG. 12 is an illustration of an embodiment in which a metallic screen or mesh 72 replaces the metallic casing 7 in the production well through the petroleum producing formation. The screen 72 works as a filter letting through fluids and stopping sand particles from entering the annulus room 8. This metallic screen 72 may similarly replace parts of the casing 7 illustrated in FIGS. 1 to 6.

Wire Waveguide Along Casing Wall

FIG. 3 illustrates an embodiment of the invention in which the internal "annulus" room (the interior of the casing below the packer above the production zone) lacks a production pipe except for in the upper portion below a packer. A transmitter 5 for generating a transverse electric field $E_{TE}$ between an outward facing side of an inner, conductive wire or rod 51 is arranged inside the casing pipe 7, and close to, but not in metallic electric contact with, the inner side of, the casing pipe 7. The conductive wire or rod 51 constitutes a waveguide for a main portion of the transmitted EM energy of the transverse electric field ETE along at least part of the two-way path for said EM signals $S_T$, $S_R$ along said conductive wire or rod 51.

Figure 4:
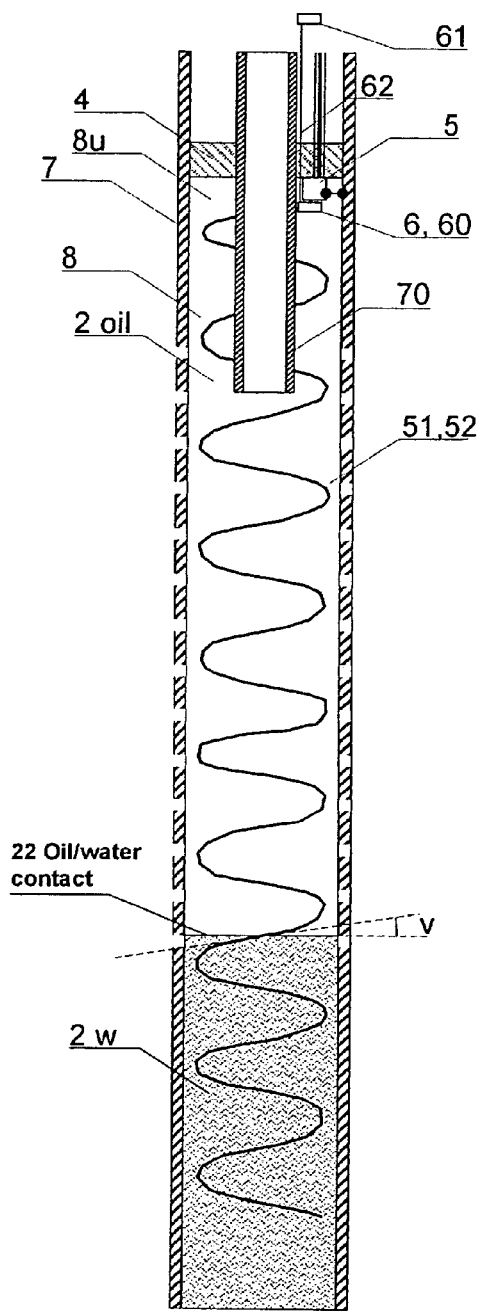
FIG. 4 illustrates a second preferred embodiment of the invention in which a helicoidal conductive wire or rod is arranged with a short separation from the inner face of the casing wall, for forming a propagation channel for electromagnetic energy propagating along the central pipe.

FIG. 4 illustrates a further development of the device shown in FIG. 3, in which the wire or rod 51 is arranged along a helicoidal path 52 along the inner wall of the casing pipe 7. The helicoidal path extends between the transmitter 5 and at least down to the oil-water contact 22, OWC. The purpose is for extending the two-way path for the transmitted and reflected EM signals ST, SR along the helicoidal path 52 of the wire 51, in order for better resolution and general improved response in measuring the position of the oil-water contact 22, OWC along the wire 51.

In a preferred embodiment of the invention, wire or rod 51 may be coated by an electrical insulation material, but this is not absolutely necessary as long as the wire 51 has a separation from the casing 7.

Wire Waveguide Along Central Pipe's Outer Wall

Figure 5:
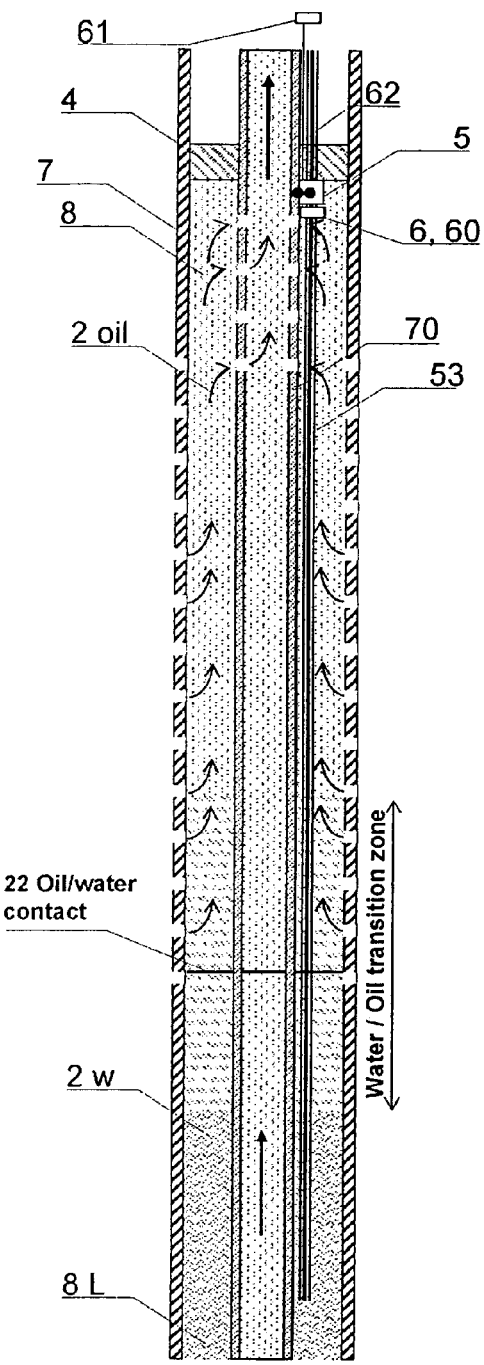
FIG. 5 illustrates another preferred embodiment of the invention, showing a casing pipe with an annulus room around a central production pipe, and a transmitter antenna arranged in the annulus space around said central pipe, and with a conductive wire or rod arranged with a short separation from the central production pipe for forming a propagation channel for electromagnetic energy propagating along the central pipe.

FIG. 5 illustrates an embodiment of the invention in which a wire waveguide is arranged along central pipe's outer wall. The transmitter 5 is arranged for generating an electromagnetic field between a conductive wire or rod 53 arranged outside of, close to but not in metallic electric contact with, the central pipe 70. In this context the wire 53 is of course in the annulus room 8. The conductive wire 52 constitutes a waveguide for a main portion of the transmitted EM energy along at least part of the two-way path for the EM signals $S_T$, $S_R$. The conductive wire 52 is arranged for generating a transverse electric field $E_{TE}$ with respect to the wire 52.

Wire Helix Along Central Pipe's Outer Wall

Figure 6:
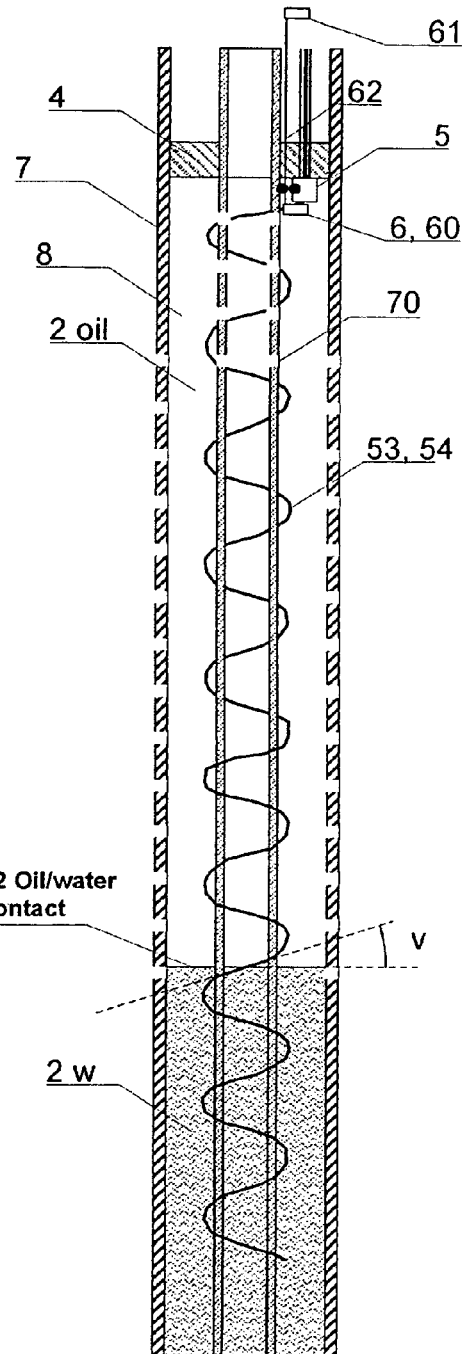
FIG. 6 illustrates a similar embodiment that resembles some kind of combination of the embodiments in FIGS. 4 and 5, in which the conductive wire or rod is arranged as a helicoidal around the central production pipe with a small separation from the central pipe, for forming a propagation channel for electromagnetic energy propagating along the helicoidal path along the central pipe.

FIG. 6 illustrates a further development of the preferred embodiment of the invention, in which the wire 53 is arranged along a helicoidal path 54 along the outer wall of the tubing pipe 70. The helicoidal path 54 with the wire 53 extends between the transmitter 5 and at least down to the oil-water contact 22, OWC, for extending the two-way path for the EM signals $S_T$, $S_R$ along the helicoidal path 54 of the insulated wire 53, in order for better resolution of measuring the distance of the oil-water contact 22, OWC along the wire 53.

Simplified Device in Openhole

In fact, in a simplified embodiment (not illustrated) of the invention, the model illustrated in FIGS. 5 and 6 would also work without the exterior casing pipe 7, i.e. in which a production pipe is arranged in an openhole production zone. In that case, the signal transmission down to and up from the oil-water contact 22 would take place with the propagating energy concentrated in the narrow space between the exterior surface of the production pipe 70 and the inwards face of the conductive wire or rod 53, 54 along the production pipe 70.

Model Parameters

In our modeling, we have used a conservative estimate for the resistivity of crude oil $\rho_{oil}$=100 Ωm. Probably this number is a low estimate, and would be higher in nature. We have used a resistivity of water or brine pw=0.50 m. The transmitter 5 is arranged 5 meters from the upper end of the annulus room 8u, and in one of our mathematically modeled examples, the oil-water contact 22, OWC is 100 meters below the transmitter 5, i.e. 105 meters below the packer 4, and 25 meters above the lower end of the annulus room 8 l. A pulse signal $S_T$ of pulse width 10 μs is emitted. The two-way propagation time will thus be about 40 μs, giving the reflected pulse signal $S_R$ good temporal separation from the transmitted pulse signal $S_T$. Pulse signal frequencies of 100 kHz and 1 MHz are used in the models. For the 100 kHz signal, the attenuation of the maximum amplitude of the pulse is 0.4 dB/m in the oil for the Hz-component, (see FIG. 7 for field component definitions) and an attenuation of 0.8 dB/m for the 1 MHz frequency signal.

Field Direction Definitions

Figure 7:
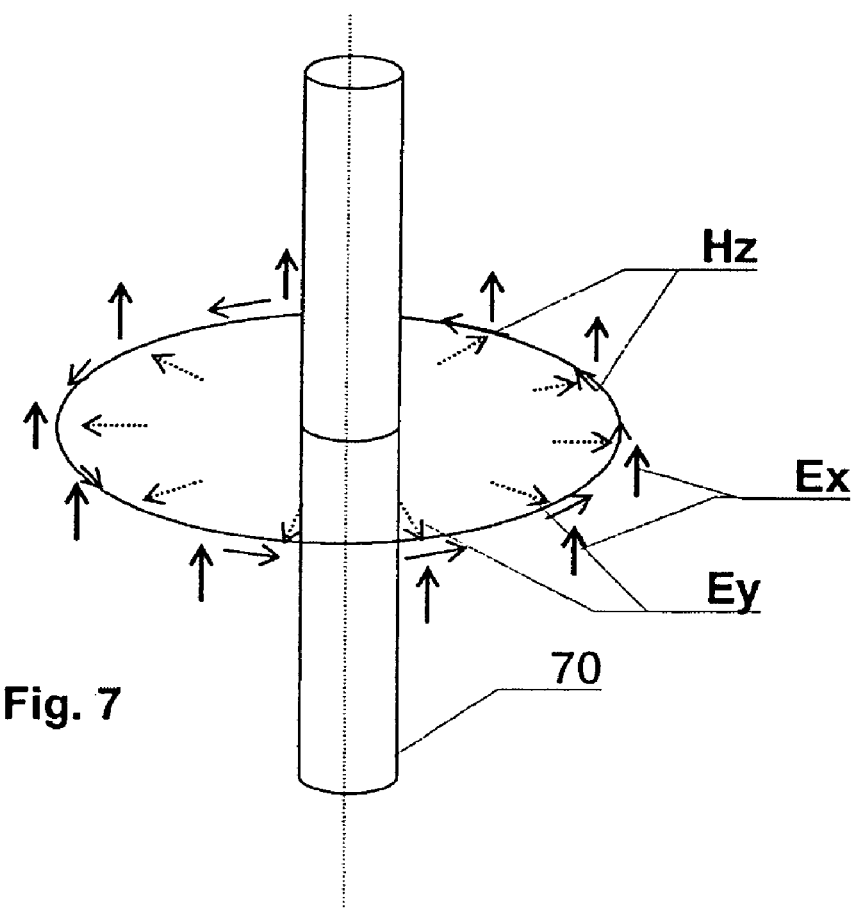
FIG. 7 defines EM vectors relative to an imagined casing-axial production tubing in a transverse magnetic (TM) axisymmetric model.

The field model shown in FIG. 7 is axisymmetric 2D, with the symmetry axis at the center of the central tube 70. Transverse Magnetic mode has the following EM-components: Hz, Ex, Ey, where Hz is the tangential magnetic field (circumferentially directed arrows), Ex is the E-field along the symmetry axis (vertical, arrows) and Ey is the radial E-field (inwards radially directed arrows) normal to the axial pipe 70.

In the case of using long wavelengths or in the case of an undifferentiated oil/water mixture in large proportions of the annulus room 8, giving problems in defining an oil-water contact 22, the reflection from the lower end of the casing (as indicated in FIG. 1) or a metal plate in the lower end of the annulus room 8 will give a two-way transit time determined by the water/oil proportion of the entire column of water inside the annulus room 8, and thus providing useful information for the production company.

The invention claimed is:

1. A device for monitoring the position of an oil/water contact between an oil-continuous fluid overlying a water-continuous fluid within a casing pipe in a production well, the device comprising:
   a transmitter for generating an electromagnetic signal ($S_T$);
   a voltage signal generator for providing electrical energy ($G_T$) to said transmitter;
   an insulated conductive wire extending down through said oil-water contact and near an inward facing wall of said casing pipe, said insulated conductive wire constituting a waveguide for a transverse-electric field ($E_{TE}$) along a two-way path for the electromagnetic signals propagating downwards and reflected signals (SR) from said oil-water contact,
   said transmitter being arranged within said oil-continuous fluid and above said oil-water contact to impose said transverse-electric field on said insulated conductive wire,
   said conductive wire constituting a waveguide for said transverse-electric field along a two-way path for the electromagnetic signals propagating downwards and reflected signals ($S_R$) from said oil-water contact;
   a sensor arranged within said oil-continuous fluid and above said oil-water contact and within said casing pipe, said sensor being operable to detect said reflected signals;
   a receiver operable to receive sensor signals ($R_R$) from said sensor; and
   an analyzing device operable analyze said sensor signals, forwarded from said receiver, with respect to two-way propagation time or amplitude in order to calculate an elevation level for said oil-water contact within said casing pipe.

2. A device according to claim 1, wherein said conductive wire is arranged along a helicoidal path along said inner wall of said casing pipe and extends between said transmitter and at least down to said oil-water contact so that said two-way path for said electromagnetic signals is extended along said helicoidal path of said conductive wire in order to improve depth resolution in measuring the position of said oil-water contact along said conducting wire.

3. A device according to claim 1, wherein said electromagnetic signal has a frequency or frequencies in a range between 1 kHz and 10 MHz.

4. A device according to claim 3, wherein said electromagnetic signal has a frequency or frequencies in a range between 100 kHz and 1 MHz.

5. A device according to claim 1, wherein the power supplied by said generator is in a range between 1 W and 10 kW.

6. A device for monitoring the position of an oil/water contact between an oil-continuous fluid overlying a water-continuous fluid within a casing pipe in a production well, the device comprising:
   a transmitter operable to generate an electromagnetic signal ($S_T$);
   a voltage generator operable to provide said transmitter with electrical energy ($G_T$);
   an insulated conductive wire extending down through said oil-water contact and extending near and along an outward facing wall of a conductive tubing string within said casing pipe,
   said transmitter being arranged within said oil-continuous fluid and above said oil-water contact so as to impose a transverse-electric field ($E_{TE}$) on said insulated conductive wire,
   said conductive wire constituting a waveguide for said transverse-electric field along a two-way path for said electromagnetic signals propagating downwards and reflected signals ($S_R$) from said oil-water contact;
   a sensor arranged within said oil-continuous fluid and above said oil-water contact, said sensor being external to said conductive tubing string and within said casing pipe, said sensor being operable to detect said reflected signals;
   a receiver operable to receive a sensor signal ($R_R$) from said sensor; and
   an analyzing device operable to analyze said sensor signal, forwarded from said receiver, with respect to two-way propagation time or amplitude in order to calculate an elevation level for said oil-water contact within said casing pipe.

7. A device according to claim 6, wherein said insulated conductive wire is arranged along a helicoidal path along said outward facing wall of said conductive tubing string and extends between said transmitter and at least down to said oil-water contact so that said two-way path for said electromagnetic signals is extended along said helicoidal path of said insulated conductive wire in order to improve depth resolution of measuring the distance of said oil-water contact along said wire.

8. A device according to claim 6, wherein said conductive tubing string extends at least between said transmitter and said oil/water contact.

9. A device according to claim 6, wherein said transmitter is arranged below or above a packer between an inner face of said casing pipe and said outside of said conductive tubing string, said packer forming an upwards barrier for fluids in an annulus room defined between an outside of said tubing string and said inner face of said casing pipe.

10. A device according to claim 9, wherein said sensor provides said received electromagnetic signal to said receiver and said analyzing device via a signal conductor arranged in a passage through said packer, with the sensor and/or the receiver being arranged below said packer.

11. A device according to claim 6, wherein said casing pipe comprises a metallic screen or mesh through a production zone.

12. A method for monitoring the position of an oil/water contact between an oil-continuous fluid overlying a water-continuous fluid inside a production casing pipe, the method comprising:
   providing a transmitter and a sensor inside said production casing pipe, in said oil-continuous fluid and above said oil/water contact;
   generating an electromagnetic signal ($S_T$) with said transmitter, the electromagnetic signal being a transverse-electric field ($E_{TE}$) imposed on an insulated conductive wire arranged inside said casing pipe,
   said electromagnetic signal partly propagating downwards from said transmitter along said conductive wire, and partly reflecting from said oil/water contact as an upward propagating reflected electro-magnetic signal along said conducting wire;
   detecting said reflected electromagnetic signal with said sensor and providing a sensor signal ($R_R$) to a receiver;
   forwarding said sensor signal to an analyzing device; and analyzing said sensor signal with respect to two-way propagation time or amplitude, and calculating an elevation level for said oil/water contact.

13. The method according to claim 12, wherein said conductive wire is arranged along a helicoidal path along said inner wall of said casing pipe and extends between said transmitter and at least down to said oil-water contact, for extending the two-way path for said electromagnetic signals along said helicoidal path of said conductive wire in order to improve resolution in measuring the position of said oil-water contact along said conducting wire.

14. The method according to claim 12, wherein said transmitter is arranged below or above a packer disposed between said inside of said casing pipe and said outside of said conductive tubing string, said packer forming an upwards barrier for fluids in an annulus room defined between an outside of said conductive tubing string and an inner face of said casing pipe.

15. The method according to claim 12, in which said electromagnetic signal generated by said transmitter has a frequency or frequencies in a range between 1 kHz and 10 MHz.

16. The method according to claim 15, wherein said transmitted electromagnetic signal has a frequency or frequencies in a range between 100 kHz and 1 MHz.

17. The method according to claim 15, wherein power is supplied by a generator to said transmitter, and the power is in a range of 1 W and 10 kW.

18. A method for monitoring the position of an oil/water contact between an oil-continuous fluid overlying a water-continuous fluid inside a production casing pipe, the method comprising:

providing a transmitter and a sensor inside said casing pipe, in said oil-continuous fluid and above said oil/water contact;

generating an electromagnetic signal ($S_T$) with said transmitter, the electromagnetic signal being a transverse-electric field ($E_{TE}$) imposed on an insulated conductive wire arranged outside a central production pipe within said casing pipe, said electromagnetic wave signal partly propagating downwards from said transmitter along said conductive wire as a guided wave, and partly reflecting from said oil/water contact as an upward propagating reflected electromagnetic signal ($S_R$) along said conducting wire;

detecting said reflected electromagnetic signal with said sensor and providing a sensor signal ($R_R$) to a receiver;

forwarding said sensor signal to an analyzing device; and analyzing said sensor signal with respect to two-way propagation time or amplitude, and calculating an elevation level for said oil/water contact.

19. The method according to claim 18, wherein said insulated conductive wire is arranged along a helicoidal path along an outer wall of said central production pipe and extends between said transmitter and at least down to said oil-water contact, for extending said two-way path for said electromagnetic signals along said helicoidal path of said insulated conductive wire, in order to improve resolution of measuring the distance to said oil-water contact along said wire.

20. The method according to claim 18, wherein said central production pipe extends at least between said transmitter and said oil-water contact.

* * * * *